May 7, 1946.  D. M. PHILLIPS  2,399,823
SWIVEL JOINT
Filed April 21, 1942

Inventor
DWIGHT M. PHILLIPS
By
His Attorney

Patented May 7, 1946

2,399,823

UNITED STATES PATENT OFFICE 2,399,823

SWIVEL JOINT

Dwight M. Phillips, Fullerton, Calif., assignor to Chiksan Tool Company, Brea, Calif., a corporation of California Application April 21, 1942, Serial No. 439,849

3 Claims. (Cl. 174—21)

This invention relates to rotatable connections or swivel joints and relates more particularly to fluid conducting swivel joints. A general object of this invention is to provide a practical, effective fluid conducting swivel joint capable of transmitting electrical current when in operation.

Another object of this invention is to provide a fluid conducting swivel joint embodying novel means for uninterruptedly transmitting electrical current between the body sections of the joint when there is high speed or low speed relative rotation between the sections.

Another object of this invention is to provide a swivel joint of the character mentioned in which the current transmitting means offers a minimum of resistance to relative rotation between the sections, develops a minimum of heat and is long wearing.

Another object of this invention is to provide a fluid conducting swivel joint of the character referred to embodying a sealed self-lubricating bearing connecting the joint sections for free relative rotation and a sealed self-lubricated sealing means for preventing the leakage of fluid under pressure from between the sections.

A further object of this invention is to provide a swivel connection of the character referred to in which the current conducting means and the sealing means may be readily replaced when worn without disturbing the bearing.

Figure 1:
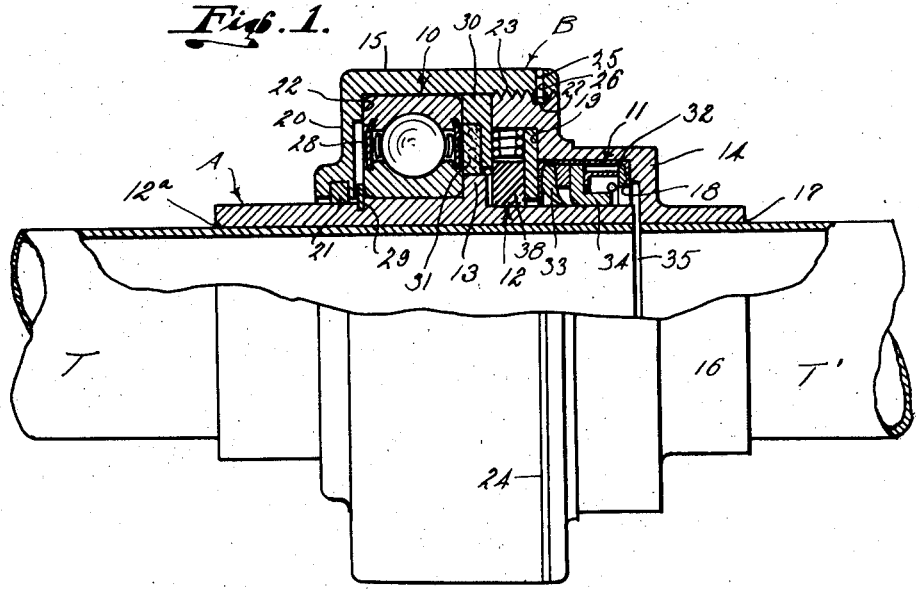
Figure 2:
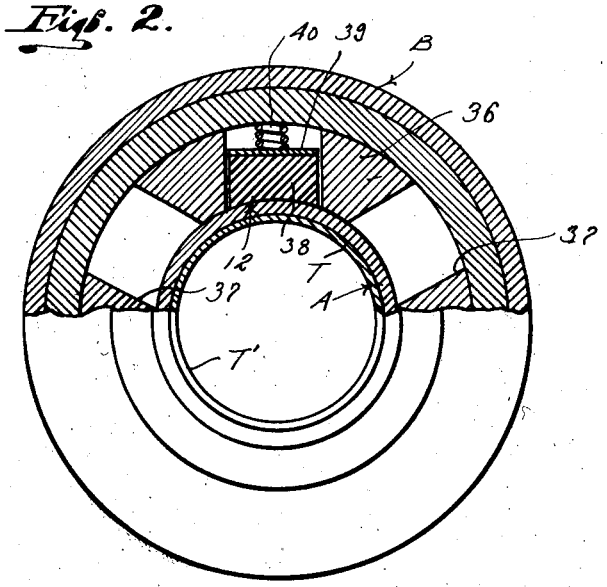

The various objects and features of my invention will be fully understood from the following detailed description of a typical preferred form and application of my invention, throughout which description reference is made to the accompanying drawing, in which:

Fig. 1 is a side elevation of the joint provided by this invention with a portion broken away to illustrate the main parts in longitudinal cross section and Fig. 2 is an end view of the joint with a portion broken away to show the principal parts in transverse cross section.

The swivel joint provided by this invention may be said to comprise, generally, two tubular sections A and B arranged in telescopic relation, an anti-friction bearing 10 connecting the sections A and B for free relative rotation, sealing means 11 for preventing the leakage of fluid from between the sections A and B and means 12 for conducting an electrical current from one section to the other.

The two sections A and B are adapted to be applied or secured to relatively rotating parts of a fluid line, or the like. The sections A and B are engaged or telescoped one within the other, the section A being the inner section and the section B being the outer section. It is to be understood that the sections A and B may be varied somewhat in shape and construction depending upon the character of the fluid line and the manner in which the sections are to be secured in the line. In the case illustrated the inner section A is an elongate tubular element of uniform internal diameter engaged on a pipe or tubing T so that the end of the tubing is substantially flush with the inner end of the section A. This provides for a uniform uninterrupted fluid passage through the section A. An annular seam 12ª of soldering, welding or brazing at the outer end of the section A secures the section to the tubing T and provides a fluid seal between the section and the tubing. An annular radially projecting flange 13 is provided on the exterior of the section A and is spaced between the opposite ends of the section. The external surfaces of the section A and the periphery of the flange 13 are cylindrical and concentric with the longitudinal axis of the joint. It will be observed that the section A is a simple one piece member.

The section B is a two piece element comprising a coupling nipple 14 to be secured to a pipe or tubing T' and a coupling or housing member 15. The coupling nipple 14 has an end portion 16 fitting around the tubing T' and secured and sealed to the tubing by a bead 17 of welding, brazing or soldering. The nipple 14 is stepped outwardly or enlarged in diameter by steps to surround the inner end portion of the section A with substantial clearance. The interior of the nipple 14 is designed to house or contain the sealing means 11 and the electrical conducting means 12. The interior of the nipple 14 has an inwardly facing or axially facing annular shoulder 18 and a second internal annular shoulder 19 facing in the same direction as and spaced inwardly or axially from the first shoulder 18. The internal wall of the nipple 14 between the shoulders 18 and 19 is cylindrical and the internal wall which extends from the shoulder 19 to the inner end of the nipple 14 is likewise cylindrical.

The housing member 15 of the section B is a cup-like part having an end wall 20 which occupies a plane normal to the longitudinal axis of the joint and a main wall or cylindrical tubular wall spaced outwardly from the section A and receiving the large end portion of the nipple 14. An annular groove in the inner edge of the wall 20 carries a grease retainer 21 of felt, or the like, which seals with the external surface of the section A. A raised annular seat 22 is provided on the internal surface of the end wall 20 adjacent its point of connection with the cylindrical main wall of the member 15. The forward or open end of the cup-like member 15 is detachably secured to the nipple 14 by threads 23. A lock ring 24 is set in an annular groove in the member 15 and has an inturned end part 25 passed through an opening 26 in the wall of the member 15 and engaged in a notch 27 in the nipple 14 to prevent unthreading of the nipple and member 15. There is a plurality of spaced openings 26 and a plurality of spaced notches 27 so related that there is an opening 26 in register with a notch 27 regardless of the rotative position the member 15 may assume when threaded on the nipple 14. This is important in securely clamping the bearing 10 in place as will be later described.

The bearing 10 serves to connect the sections A and B for free relative rotation. The bearing 10 surrounds or is engaged on the section A and is housed or received within the member 15 of the section B. In the preferred construction the bearing 10 is a suitable ball bearing embodying inner and outer races and a series of balls engaged between the races. Seals or lubricant retainers 28 engage between the races of the bearing 10 at opposite sides of the balls to retain lubricant in the bearing so that it is self-lubricating. The inner race of the bearing 10 may directly engage on the periphery of the section A and may have its inner end in direct engagement with the flange 13. A spring lock ring 29 is engaged in an annular groove in the section A and cooperates with the outer end of the inner bearing race. The ring 29 acts as a safety element to retain the bearing 10 in the correct position on the section A. The outer end of the outer bearing race bears on the above described seat 22 of the member 15 and the periphery of the outer race may directly engage with the internal surface of the member 15.

A thrust member or spacer 30 is engaged between the nipple 14 and the bearing 10. The spacer 30 is positioned within the cup-like member 15 to lie in substantially the same plane as the flange 13. The inner end of the threaded nipple 14 clamps against the spacer 30 and the spacer 30 in turn clamps against the end of the outer bearing race so that the bearing is held against the seat 22. A grease retainer 31 of felt, or other suitable material, is arranged in an annular groove in the spacer 30 to seal with the periphery of the flange 13. It will be observed that the bearing 10 is housed where it is entirely protected from external foreign matter, the grease retainers 21 and 31 serving to prevent dust and foreign matter from reaching the bearing.

The sealing means 11 serves to prevent the leakage of fluid under pressure from between the sections A and B. The means 11 is housed within the nipple 14 and seals with the inner end portion of the section A. In accordance with the broader aspects of the invention the sealing means 11 may comprise any selected or required type of sealing assembly. In the drawing I have shown a self-lubricating sealing unit comprising a carrier or cage 32. The cage 32 is an annular member of channel shape cross section which seats within the nipple 14 to have one end bear against the shoulder 18 and to have the other end lie in the same plane as the shoulder 19. Two spaced sealing rings 33 and 34 are carried in the cage 32 to seal with the peripheral surface of the section A. The ring 33 has a tapering active part sloping or pitched through its engagement with the surface of the section A, while the ring 34 is L-shaped in transverse cross section and has an inner flange which conforms to the periphery of the section A. The cage 32 carries spacers for the rings 33 and 34 and may contain lubricant for the sealing rings. It should be observed that the sealing means 11 occurs adjacent the space or gap 35 which is left between the ends of the tubes T and T' and between the inner end of the section A and the nipple 14. The sealing means 11 is positioned so it prevents the fluid under pressure in the line from reaching the means 12 and the anti-friction bearing means 10.

The means 12 is a feature of the invention, operating to maintain a full adequate and uninterrupted path for the transmission of electrical current between the sections A and B at all times. The electrical conducting means 12 is housed or contained in the nipple 14 of the section B and includes a cage or carrier 36. The carrier 36 is in the nature of a ring fitted within the nipple 14 and held between the shoulder 19 and the spacer 30, having one side bearing on the shoulder 19 and having its other side bearing on or engaged by the spacer 30. The carrier 36 may form an abutment for the inner end of the cage 32 of the sealing means 11 and thus may serve to hold the sealing means 11 in the operative position. The periphery of the carrier 36 engages with the interior of the nipple 14, while the internal surface of the carrier 36 is spaced from and clear of the section A. The inner side of the carrier 36, that is, the side which opposes the spacer 30 has a plurality of circumferentially spaced radial grooves or slots 37. The slots 37 have straight flat walls and are preferably of uniform size and shape.

The means 12 further includes blocks or brushes 38 of conducting material arranged in the slots 37 to contact the section A. The number of brushes 38 employed may vary in different forms and applications of the invention. I have found it practical to employ two diametrically opposite brushes 38 and where more than two slots 37 are present, the excess slots may remain unoccupied. The brushes 38 are preferably carbon brushes proportioned to shiftably or slidably fit the slots 37 and their inner faces are cylindrically concaved to evenly bear on the periphery of the section A. The brushes 38 are guided for radial movement or advancement by the walls of the slots 37 and the side face of the spacer 30. It will be observed from an inspection of Fig. 1 that the brushes 12 are spaced from and clear of the flange 13 of the section A but slidably ride on the side face of the spacer 30. The brushes 38 are spring held or spring urged to maintain their correct engagement with the section A. Follower plates 39 of metal or other rigid material are arranged against the outer ends of the brushes 38. Springs 40 are arranged under compression between the follower plates 30 and the internal surface of the nipple 14. The springs 40 urge the brushes 38 inwardly into contact with the periphery of the section A and compensate for the wear of the brushes by advancing the brushes as the wear progresses. The spaced carbon brushes 38 provide an ample electrical connection between the sections A and B and this connection is continuous or uninterrupted during relative rotation between the joint sections. The sealing means 11 prevents the fluid from the line from reaching the carbon brushes 12, while the grease retainer 31 serves to prevent dust from the carbon brushes from reaching the anti-friction bearing 10.

It is believed that the utility and practicability of the coupling provided by this invention will be readily apparent from the foregoing detailed description. During operation fluid under pressure may be conducted through the tubes T and T' and the sealing means 11 effectively prevents the escape of the fluid pressure from between the sections A and B. The anti-friction bearing 10 connects the sections A and B for relative rotation and assures a minimum of friction. The bearing 10 is self-lubricating and is fully protected so that it is long wearing. The carbon brushes 38 provide for the direct transmission of electrical current from one section A or B to the other and are spring urged to maintain a complete electrical connection between the two sections at all times. In the event the sealing means 11 or the means 12, or both, require repair or replacement the member 15 is unthreaded from the nipple 14. Preparatory to this operation the lock ring 24 is removed. With the member 15 unthreaded from the nipple 14 the member may be retracted along the section A to make the sealing means 11 and the means 12 readily accessible. However, the sealing means 11 is self lubricating and the carbon brushes 38 are long wearing and the joint will withstand extensive usage before it requires repacking or new brushes.

Having described a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A swivel joint for connecting two fluid conducting tubes comprising a tubular inner section to be secured to one tube, a tubular outer section to be secured to the other tube and surrounding the inner section, bearing means connecting the sections for free relative rotation, a carrier fitted with the other section and having a plurality of spaced radial slots, shiftable brushes in the slots, and springs urging the brushes inwardly against the inner section to maintain an electrical connection between the sections.

2. A swivel joint for connecting two fluid conducting tubes comprising a tubular inner section to be secured to one tube, a tubular outer section to be secured to the other tube and surrounding the inner section, the outer section comprising a nipple to be secured to said other section and having an internal shoulder and a cup shaped member whose open end portion is threaded on the nipple, a bearing in said member connecting the sections for relative rotation, a spacer in said member between the inner side of the nipple and the bearing, a carrier held between the spacer and said shoulder, the side of the carrier which faces the spacer having radial slots, and spring urged contact brushes in the slots engaging the inner section.

3. A swivel joint for connecting two fluid conducting tubes comprising a tubular inner section to be secured to one tube, a tubular outer section to be secured to the other tube and surrounding the inner section, the outer section comprising a nipple to be secured to said other section and having an internal shoulder and a cup shaped member whose open end portion is threaded on the nipple, a bearing in said member connecting the sections for relative rotation, a spacer in said member between the inner side of the nipple and the bearing, a carrier held between the spacer and said shoulder, the side of the carrier which faces the spacer having radial slots, spring urged contact brushes in the slots engaging the inner section, and sealing means in the nipple at the other side of the carrier for sealing between the sections to prevent fluid from reaching the brushes and bearing.

DWIGHT M. PHILLIPS.